(12) United States Patent
Murai et al.

(10) Patent No.: US 8,754,347 B2
(45) Date of Patent: Jun. 17, 2014

(54) RESISTANCE SPOT WELDER

(75) Inventors: Toshio Murai, Kanagawa (JP); Yoshiaki Iwamoto, Kanagawa (JP)

(73) Assignee: Dengensha Manufacturing Company Limited, Kawasaki-shi, Kanagawa-ken (JP)

( * ) Notice: Subject to any disclaimer, the term of this patent is extended or adjusted under 35 U.S.C. 154(b) by 342 days.

(21) Appl. No.: 11/707,265

(22) Filed: Feb. 16, 2007

(65) Prior Publication Data

US 2007/0199556 A1 Aug. 30, 2007

(30) Foreign Application Priority Data

Feb. 17, 2006 (JP) ................................ P2006-041674

(51) Int. Cl.
*B23K 9/32* (2006.01)

(52) U.S. Cl.
USPC ............................ 219/86.25; 219/90; 219/116

(58) Field of Classification Search
USPC ......................................... 219/86.25, 90, 116
See application file for complete search history.

(56) References Cited

U.S. PATENT DOCUMENTS

| 5,719,367 | A | | 2/1998 | Young | |
|---|---|---|---|---|---|
| 5,928,531 | A | * | 7/1999 | Sato et al. .................. | 219/86.25 |
| 6,977,145 | B2 | * | 12/2005 | Fouillet et al. .................... | 435/6 |
| 7,067,768 | B2 | * | 6/2006 | Miwa et al. .............. | 219/137.62 |
| 2003/0189029 | A1 | | 10/2003 | Kilabarda et al. | |

FOREIGN PATENT DOCUMENTS

| DE | 19904651 | A1 | | 8/2000 | |
|---|---|---|---|---|---|
| EP | 1129809 | A2 | | 9/2001 | |
| JP | 6-218553 | | | 8/1994 | |
| JP | 06218553 | A | * | 8/1994 | ............. B23K 11/11 |
| JP | 3042267 | | | 7/1997 | |
| JP | 2569558 | | | 1/1998 | |
| JP | 2000-271754 | A | | 10/2000 | |
| JP | 2000271754 | A | * | 10/2000 | ............. B23K 11/11 |
| JP | 2001150147 | A | * | 6/2001 | ............. B23K 11/11 |
| JP | 2004-160466 | A | | 6/2004 | |

(Continued)

OTHER PUBLICATIONS

European Search Report dated Jul. 7, 2011, for European Patent Application No. 07003434.3; 9 pages.

(Continued)

*Primary Examiner* — Henry Yuen
*Assistant Examiner* — Ayub Maye
(74) *Attorney, Agent, or Firm* — Drinker Biddle & Reath LLP

(57) ABSTRACT

A resistance spot welder includes: a motor, having a shaft; a cylindrical casing; a hollow guide rod, inserted into the casing, and adapted to be moved linearly for moving a first electrode tip facing a second electrode tip provided at a gun arm; a ball nut, fixed in an inner circumference of the guide rod; a ball screw, fitted through the ball nut; a coupling, including a first fastening portion into which the shaft of the motor is inserted and a second fastening portion into which the ball screw is inserted and which is opposite to the first fastening portion; and a bearing, fitted between an outer circumference of the first fastening portion and an inner circumference of the casing. The guide rod is moved between a first point which is a motor side and a second point which is an electrode tip side. When the guide rod is positioned at the first point, the guide rod accommodates at least a part of the second fastening portion.

14 Claims, 10 Drawing Sheets

(56) References Cited

FOREIGN PATENT DOCUMENTS

| | | | | | |
|---|---|---|---|---|---|
| JP | 2004160466 | A | * | 6/2004 | ............. B23K 11/11 |
| JP | 2005-66651 | | | 3/2005 | |
| JP | 2005155693 | A | * | 6/2005 | ............. F16H 25/20 |
| JP | 2005155693 | A | | 6/2005 | |

OTHER PUBLICATIONS

Partial European Search Report dated Apr. 26, 2011, for European Patent Application No. 07003434.3; 5 pages.

Japanese Office Action (with English translation) issued in Japanese application No. 2006-041674 dated Aug. 1, 2011.

* cited by examiner

FIG. 2A
FIG. 2B
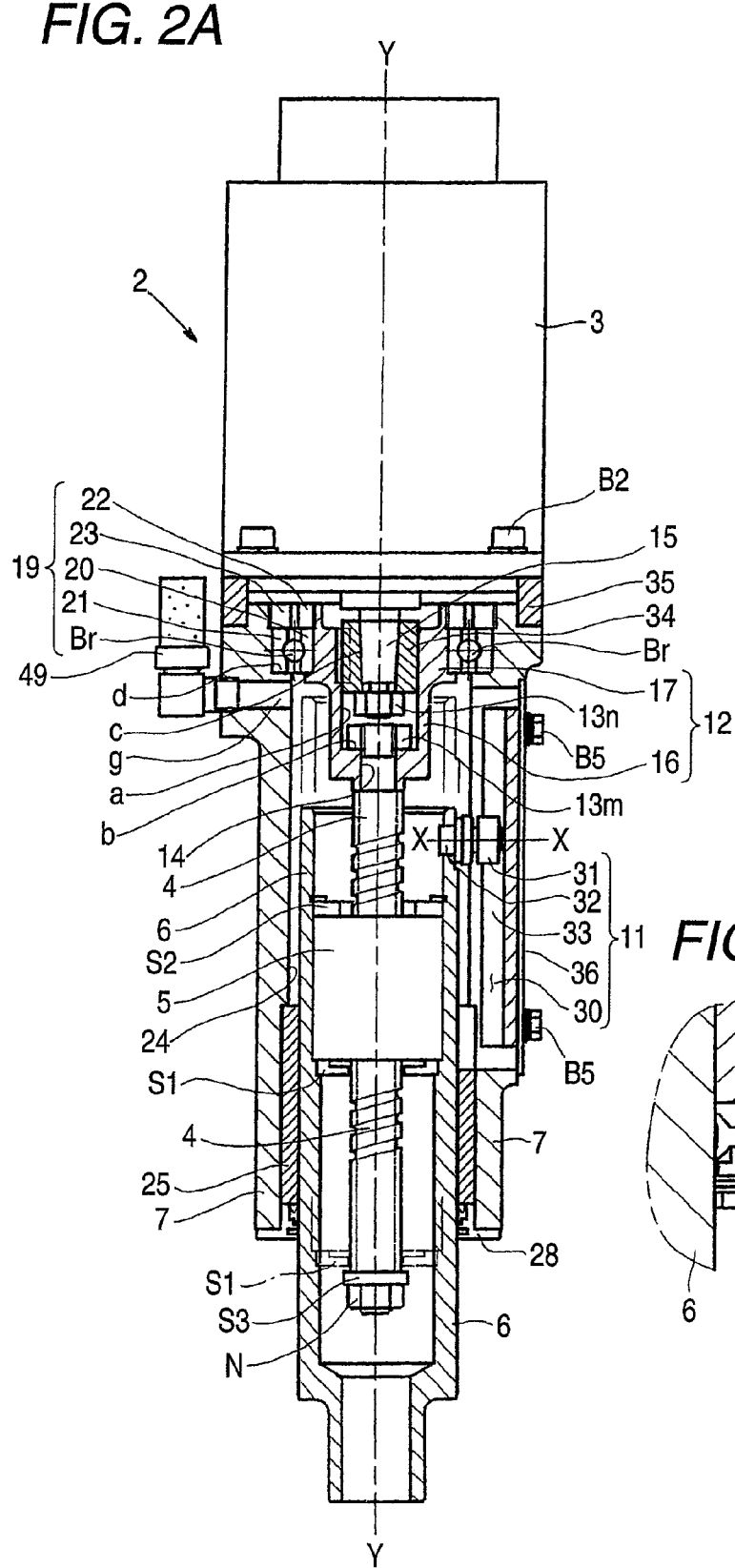
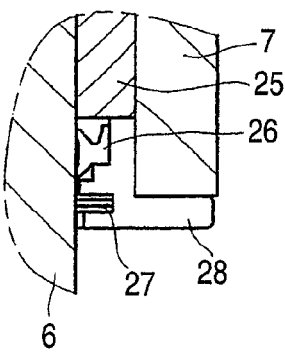

A-A

RESISTANCE SPOT WELDER

CROSS-REFERENCE TO RELATED APPLICATIONS

This application is based upon and claims the benefit of priority from prior Japanese patent application No. 2006-041674, filed on Feb. 17, 2006, the entire contents of which are incorporated herein by reference.

BACKGROUND OF THE INVENTION

The present invention relates to a resistance spot welder including a robot welding gun, a portable spot welding gun or a stationary type spot welder and, more particularly, to a resistance spot welder including a drive unit for generating a torque for applying a pressing force necessary for a welding operation between a pair of electrode tips by using an electric motor.

In the related art, the resistance spot welder, which repeatedly performs the power supply and the melting by a resistance heat generation, is equipped with a cooling device for preventing the temperature rise of the electrode tips. In the cooling device of the related art, either a secondary conductor including a welding transformer or a welding gun arm using a copper alloy, an aluminum alloy or the like is equipped in its surface with a piping groove of a recessed section, along which a circulation line cooling tube (a water-cooled pipe or a water-cooled hose) made of copper is fitted and fixed, or a circulation line cooling tube made of copper is cast in an aluminum alloy thereby to circulate water in the electrode tips.

There is the following cooling device of a spot welding gun of the related art. In the surface (including the side faces) of a gun arm made of a non-ferrous metal of an aluminum group, for example, a groove of a generally recessed section having a depth in the thickness direction is formed in the longitudinal direction of the gun arm, and a water-cooled pipe made of copper is fitted in and along the recessed groove and is fitted on the inner face of the recessed groove (JP-A-2005-66651, Par. Nos. 0013-0016).

In the cooling device of this kind of the related art, however, in case the water-cooled pipe of copper is fitted in the groove of the recessed section of the gun arm of aluminum, it is forcibly hit by a hammer or the like so that the water-cooled pipe is easily affected by the deformation or breakage due to a plastic deformation. Moreover, a highly precise working of the groove inner face is required for fitting the curve of the water-cooled pipe and the inner face of the recessed groove.

Moreover, it is not easy to improve the problem of corrosion of the contact face and the joint portion between the copper material and the aluminum material due to the potential difference, and to make the fastening structure of the water-cooled pipe and the tip holder. In case the water-cooled pipe of copper in the related art is connected to the water feed and discharge ports of a water-cooled manifold, a relay insulation device is required to increase the weight accordingly.

There is another cooling device for the welding gun (JP-A-6-218553, Par. Nos. 0004-0005). In this related art, a cooling water distribution member is interposed between a gun arm and a tip base (also called as the "tip holder"). A water-cooled pipe is jointed to the leading end side of the cooling water distribution member. A pair of connection pipes is disposed on the side of the rear end of the cooling water distribution member. The water-cooled pipes on the feed side and the discharge side of the cooling water can be freely connected to that connection pipes.

However, the cooling device of this kind of the related art is equipped with the cooling water distribution member. As a result, the number of parts is increased, and it is not easy to mount and demount the water-cooled pipe thereby to complicate the design and structure.

In a drive unit 2 of the related art, in which an electric motor 3 and a ball screw 4 are directly connected, as shown in FIG. 10, the electric motor 3 is mounted on the head side of a casing 7, and the leading end of the output shaft 15 of the motor and the rod head portion of the ball screw 4 are connected through a fastening device having a coupling 12 carrying a resin material. A coupling housing H accommodating the fastening device is mounted on the head side of the casing 7 by means of bolts B1. The electric motor 3 is fixed on the coupling housing H by bolts B2. A ball bearing 19 is attached concentrically of the inner circumference of the casing to the head side of the casing communicating with that coupling housing II, by means of bolts B3.

The ball screw 4 connected directly to the output shaft 15 through the coupling 12 is inserted into that ball bearing 19. Moreover, the bush (although not shown) is fixed in the inner circumference of the rod side of the casing, and a ball nut 5 is fixed by the bolts (although not shown) on the upper portion of the inner circumference of a guide rod 6 inserted into that bush. The ball screw 4 is assembled (engaged) with that ball nut 5.

The electric motor 3 transmits the rotating motions outputted from its output shaft 15, to the ball screw 4 through the coupling 12 in the housing H. The rotating motions are converted into linear movements of the guide rod 6 by a reduction gear mechanism such as the ball nut 5, so that a torque for a pressure necessary for the welding operation is generated in one electrode tip (although not shown) thereby to press the weld zone (as referred to FIG. 10).

Moreover, the rotation stop is to block the movement in the rotational direction of the guide rod 6 to move back and forth (reciprocate), as is called so.

In the related rotation stopping device, a rotation stopping rod, which is so fixed on a tip holder fixed at the leading end of a guide rod for holding the other electrode tip as is eccentric in parallel with the axial center line (as will be called the "center axis") of the guide rod, is inserted into a through hole formed in the front portion on the casing side, and reciprocates in the through hole in association with the movements of the guide rod.

As a result, even if the force to rotate the guide rod on the center axis in a positional relation with the pressure axis of the guide rod and the electrode pressing position being eccentric is applied to the guide rod, the rotation stopping rod is inserted into the through hole thereby to block the rotation of the guide rod (Japanese Utility Model No. 2569558, Par. No. 0005).

In the drive unit of the related art of FIG. 10, the output shaft of the servo motor, the ball screw, the coupling, the bearing and so on are coupled in series in the longitudinal direction of that unit. The presence of the coupling housing (as also called the "coupling box") for accommodating the coupling or the like on the head side of the casing and the aforementioned external structure becomes one cause for enlarging the size and increasing the weight of that unit. In the related art, moreover, toothed grooves are jointed to the spline shaft and the inner circumference of the bush thereby to stop the rotation and transmit the torque. The structure of this kind raises a problems that it is difficult to seal the jointed portion among the cylinder, the spline shaft and the bush, and that a high cost is required for the parts.

There is a related structure, in which a linear guide is used for the rotation stop. Between the casing and the guide rod, for example, V-grooved rails are mounted on their confronting faces, and a plurality of balls or rollers are assembled between the two V-grooved rails so that the balls or rolls may rotate freely. As a result, the moving guide rod is placed along the V-grooved rails of the casing thereby to stop the rotation of the guide rod (Japanese Utility Model No. 3042267, Par. No. 0012).

In the rotation stopping device of this kind, however, cross guide rails or ball guide rails of high grades are used so that high working precision and assembling precision are required to make it difficult to adjust the pilot pressure of the rotating members such as rolls or balls. Because of the arrangement of four guide rails, moreover, the retention of the space becomes one cause to promote the large-sized design structure. Improvements have been desired in case the design for lower weight and cost is taken into consideration.

SUMMARY

It is therefore an object of the invention to solve the problems: the structural problem that the presence of a fastening device including a coupling connecting the output shaft of a motor and a bearing and an external rotation stopping device becomes a structural causes to enlarge the size and to increase the weight; the problem of a breakage accident that a water-cooled pipe of copper in a cooling device is broken due to the plastic deformation which is forcibly caused when the water-cooled pipe is fitted in a recessed section groove formed in the two side aces of a gun arm of aluminum; the problems of a high working precision needed for working the inner faces of the recessed groove and a corrosion due to the potential difference at the contacting face and the jointed portion between the copper material and the aluminum material; and the problems of uneasiness of countermeasures for preventing invasion of foreign substances such as sputter, water or dust and of fastening of the water-cooled pipe.

In order to achieve the object, according to the invention, there is provided a resistance spot welder comprising:

a motor, having a shaft;

a cylindrical casing;

a hollow guide rod, inserted into the casing, and adapted to be moved linearly for moving a first electrode tip facing a second electrode tip provided at a gun arm;

a ball nut, fixed in an inner circumference of the guide rod;

a ball screw, fitted through the ball nut;

a coupling, including a first fastening portion into which the shaft of the motor is inserted and a second fastening portion into which the ball screw is inserted and which is opposite to the first fastening portion; and a bearing, fitted between an outer circumference of the first fastening portion and an inner circumference of the casing, wherein the guide rod is moved between a first point which is a motor side and a second point which is an electrode tip side, and when the guide rod is positioned at the first point, the guide rod accommodates at least a part of the second fastening portion.

An inner circumference of the second fastening portion may be formed with a step portion on which an end of the ball screw is fixed. An inner circumference of the bearing may be fixed to the outer circumference of the first fastening portion and an outer circumference of the bearing may be fixed to the inner circumference of the casing. The shaft of the motor may be fixed in an inner circumference of the first fastening portion of the coupling.

A motor bracket may be arranged between the motor and the casing. The shaft of the motor may be fixed in the first fastening portion of the coupling.

The inner circumference of the guide rod may be no more than the outer circumference of the first fastening portion in diameter. The inner circumference of the guide rod may be no less than an outer circumference of the second fastening portion in diameter.

The shaft of the motor may have one of a cylindrical shape and a tapered shape. An adapter may be fitted on the shaft of the motor.

A side wall of the casing may be formed with a opening portion extending within a range between the first point and the second point. A cam groove member may be provided on the opening portion and include at least one guide rail. The guide rod may include at least one roller follower guided along the at least one guide rail.

The cam groove member may include a bottom plate and two guide rails which are parallel with each other and stand on both ends of the bottom plate. The at least one roller follower may be guided between the two guide rails.

A plate cover for closing the at least one roller follower and the cam groove member may be provided on the opening portion of the casing.

The bottom plate of the cam groove member may be fixed on the plate cover.

An oilless bush may be disposed in the inner circumference of the casing at the electrode tip side. A scraper may be disposed on the oilless bush at the electrode tip side. A cap may be mounted on the casing from the electrode tip side.

The gun arm may be formed with a piping groove to be a cooling medium passage. A cooling tube having a coating cover made of a refractory rubber material or a refractory synthetic resin material may be fitted and fixed in the piping groove. The cooling tube may have one end connected to one of a secondary conductor connected to a welding transformer and a water-cooled manifold and the other end connected to a cooling medium passage leading to an inside of the second electrode tip fixed at the gun arm.

The cooling tube may include an inner tube made of the refractory synthetic resin material under the coating cover.

The gun arm may be made of a non-ferrous material of an aluminum group and include a gripping portion having an opened U-shape at a leading end thereof. The gripping portion may communicate with the piping groove. A tip base having the second electrode tip may be inserted into the opened U-shape of the gripping portion and held by a fastening member applying a force in a direction to close the opened U-shape.

The tip base may have a cooling medium passage connected to the inner tube of the cooling tube.

BRIEF DESCRIPTION OF THE DRAWINGS

FIG. 2A is a sectional view of an embodiment of a drive unit of the invention. FIG. 2B is a broken sectional view showing a portion of a leading end opening portion of a casing in the drive unit according to the invention.

DETAIL DESCRIPTION OF PREFERRED EMBODIMENTS

Figure 1:
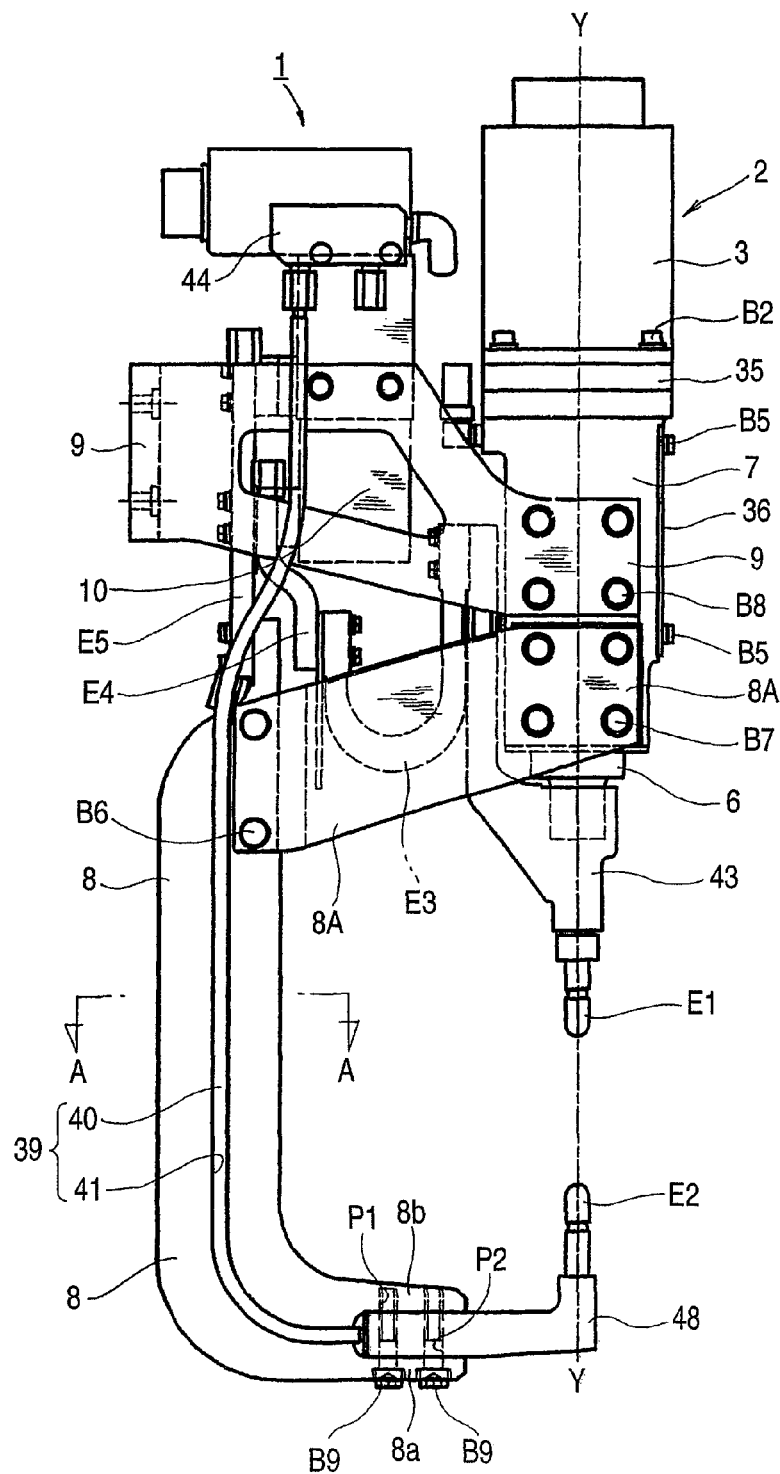
FIG. 1 is an assembly diagram showing the front entirety of a robot welding gun of an embodiment of a resistance spot welder of the invention.
Figure 3:
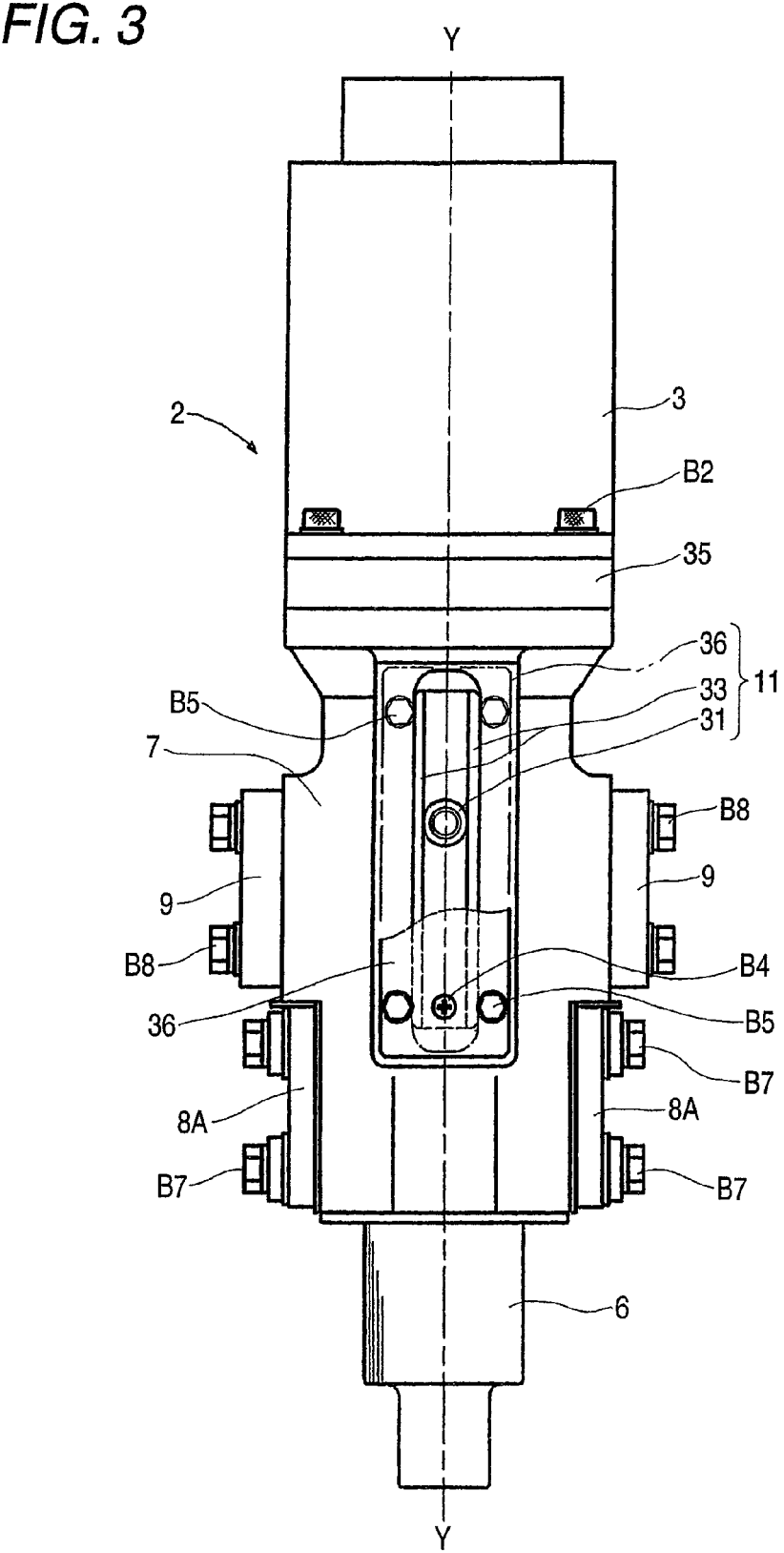
FIG. 3 is an external view of the drive unit of the invention.

The invention contemplates to provide various resistance welders. Here is exemplified a robot welding gun having a drive unit, in which the position control of one of two electrode tips, and the relative speed and the pressure control at the approaching time are controlled by the digital control from at least one controller, in synchronism with the actions of a plurality of axes owned by the robot device, and by a program setting according to the welding sequence and the welding parameters. Embodiments of the invention are described in the following with reference to the accompanying drawing.

In FIG. 1, FIGS. 2A and 2B or FIG. 3, a robot welding gun 1 includes: a drive unit 2 for converting the rotational motion of an electric motor 3 into the linear motion of a guide rod 6 by a ball screw 4 and a ball nut 5; rotation stopping means 11 (as will be called the rotation stopping device) of gun brackets 9 for supporting the drive unit and the guide rod 6; a welding unit 10 having an electrode tip, a gun arm, a secondary conductor, a welding transformer and so on; and a cooling device 39.

The other electrode tip E2 is held at the leading end of a gun arm 8, which is attached at its rear end to arm bases 8A by bolts B6. The rear ends of the arm bases 8A are fixed on a casing 7 of the drive unit 2 through an insulating plate by bolts B7. The gun brackets 9 are fixed on the drive unit through bolts B8 and are supported by a robot arm (although not shown) having a plurality of axes.

The welding unit 10 (of which the welding transformer is designated) includes: the welding transformer for feeding a welding current between an electrode tip (the other electrode tip) E2 and the electrode tip E1 (mentioned above as one of two electrode tips), which is brought toward and apart from the electrode tip E2 for the welding operation by the drive unit; a movable shunt E3; and/or rigid secondary conductors E4 and E5.

The cooling device 39 (as designated by numerals to include a sputter preventing circulation line cooling tube 40 and a piping groove 41) pipes the gun arm 8, the shunt E3, the secondary conductors E4 and E5, a tip holder 43, a tip base 48 and so on with the cooling tubes so that the cooling medium may be circulated in the electrode tips E1 and E2 thereby to block the temperature rise of the electrode tips, as might otherwise be resistance-heated, by its heat exchanging action.

The rotation stopping device 11 (as designated to include a cam groove 30, a roller follower 31, guide rails 33 and other related parts) of the guide rod 6 blocks the rotation of the guide rod for driving the electrode tip E1 on one movable side, while eliminating the trouble in the welding action and the deviation of the point position.

In the drive unit 2, the ball screw 4 is fastened (fitted) in the threaded hole of the ball nut 5 fixed at a predetermined position in the hollow guide rod concentrically inserted into the casing 7 having a cylindrical section. A coupling 12 is fastened on the rod head of the ball screw 4. The coupling 12 and the ball screw 4 are reliably fastened by a lock nut 13 and a stop screw. As seen from the sectional views of FIG. 2A and FIG. 4A, a inner circumference for a connection hole is formed in the coupling 12 in alignment with the center axis Y-Y of that unit.

In the coupling 12, a front fastening portion 16 of a smaller diameter and a rear fastening portion 17 of a larger diameter are integrally formed. The inner circumference of the front fastening portion 16 and the inner circumference of the rear fastening portion 17 communicate with each other. In the inner circumference of the rear fastening portion 17, there is formed a recessed section groove (or a inner circumference a of FIG. 2A), which has a larger size than the inner circumference diameter of the front fastening portion 16. As a result, a stepped mounting face (b in FIG. 2A) is formed between the inner circumference of the front fastening portion 16 and the recessed groove. The threaded portion of the rod head of the ball screw is reliably in that stepped fastening face b by the fastening force of the lock nut 13m.

The output shaft 15 of the later-described electric motor 3 is inserted into the inner circumference of rear fastening portion 17 and is reliably fixed by the fastening force of a lock nut 13n. As a result, the ball screw 4 and the output shaft 15 of the electric motor 3 are individually inserted and fastened in the confronting directions on the common center axis Y-Y by the fastening device of the coupling 12.

A ring-shaped ball bearing 19 is fitted and fixed on the outer circumference of the rear fastening portion 17, into which the output shaft 15 of the coupling 12 is inserted. In the ball bearing of this case, a plurality of balls Br (or steel balls) are rotatably inserted in the circumferential groove of semi-spherical sections formed in the mutually confronting faces of the inner race 20 and the outer race 21 of the ball bearing. The inner race 20 is reliably fastened and fixed on the outer circumference of the rear fastening portion 17 of the coupling 12 by inner bearing nuts 22 and stop screws.

The outer race 21 of the ball bearing is fixed on the stepped mounting face d of the recessed section groove formed in the inner circumference of the casing 7, by fastening outer bearing nuts 23 and stop screw.

The casing 7 having the cylindrical section is cast of an aluminum alloy and acts as the case cover, as called so, of the drive unit. The guide rod 6 is concentrically inserted into a rod inserting hole 24 extending through the center axis Y-Y of the casing. An oilless metal bearing 25 is fixed on the rod side (electrode tip side) of the rod inserting hole 24. A lubricating medium such as grease is applied to the inner side of the oilless metal bearing 25 of the casing 7 and the outer circumference of the guide rod 6 thereby to lubricate the sliding frictional face of the guide rod 6.

A scraper 26 and a coil scraper 27 are interposed between the leading end portion of the casing 7 and the oilless metal bearing 25. The lubricating medium is also applied to the frictional faces of the individual scrapers. The scrapers are reliably fitted in the casing by a cap 28 attached to the leading opening of the casing 7 from the outside of scrapers.

The guide rod 6 is inserted into the casing of the cylindrical section, and the ball screw 4 is fitted in the threaded hole of the ball nut 5 fixed in the inner circumference of the guide rod 6 by parallel pins (although not shown). To the leading end face of the ball nut 5, there is attached a stopper S1, e.g., a dish spring of iron, which has a flat face in a direction normal to the center axis Y-Y of the ball screw 4. Likewise, a stopper block S2 is attached to the rear end face of the ball nut 5 at a portion to confront the leading end of the coupling 12.

The stopper S1, as attached to the leading end face of the ball nut 5, corresponds to a stopper S3 attached to the threaded portion of the rod leading end of the ball screw 4 by a nut N, and abuts at the forward stroke position, i.e., the lower end position S1, as indicated by broken lines in FIG. 2A. A stopper S2, as attached to the rear end face of the ball nut 5, corresponds to the leading end face of the coupling 12, and abuts at the backward stroke position of the guide rod, i.e., the upper end position of the guide rod, as indicated by broken lines in FIG. 2A. As a result, the movement of the guide rod 6, in which the ball nut 5 moves along the ball screw 4, is regulated, and the shocks at the abutting time of the ball nut can be absorbed by the individual stoppers.

Here, the materials for the individual stoppers S1 to S3 are suitably selected from a shock absorbing material of a nylon family, a rubber family or a synthetic resin family, or an elastic material such as a spring member of iron in accordance with their applications.

The coupling 12 is assembled with the head side (motor side) of the casing 7. In this case, a step is formed in the inner circumference of the head side opening of the casing, and the ball bearing 19 fixed on the outer circumference of the larger portion of the coupling 12 is fitted in the bearing groove formed in the circumferential shape. By the outer bearing nut, the fastening force is applied from one side face of the outer race 21 of the ball bearing 19 to the step portion (as indicated by d in FIG. 2A) of the receiving groove, so that the coupling 12 is rotatably mounted on the side of the casing 7.

The inner diameter of the head side of the guide rod 6 and the external diameters of the front fastening portion 16 and the rear fastening portion 17 of the coupling 12 are so set that the guide rod 6 has an internal diameter of 52 mm, that the front fastening portion 16 of the coupling 12 has an internal diameter of 40 mm, and that the rear fastening portion 17 has an external diameter of about 62 mm. At the position where the guide rod 6 is retracted in its full stroke, the front fastening portion 16 of the coupling 12 is inserted (accommodated) at its retracted position wholly or partially into the guide rod. Thus, it is possible to reduce the size of the fastening portion in the longitudinal direction of the ball screw 4 and the output shaft 15.

Here, the coupling 12 is so shaped that the diametrical size of the rear fastening portion 17 can be made smaller than that of the front fastening portion 16 in accordance with the mechanical fastening condition with the output shaft of the mating electric motor.

An air bleeding device 49 with a filter is disposed on the outer side of the casing 7. This air bleeding filter device 49 is connected to a port communicating with the inside of the casing 7. When the ambient air is sucked into and discharged from the inside of the casing 7 by the piston actions of the guide rod 6, the foreign substance such as the dust or sputter in the ambient air is sucked into the casing thereby to avoid a problem, as might otherwise result from the dragging or seizure of the sliding portion.

Figure 5:
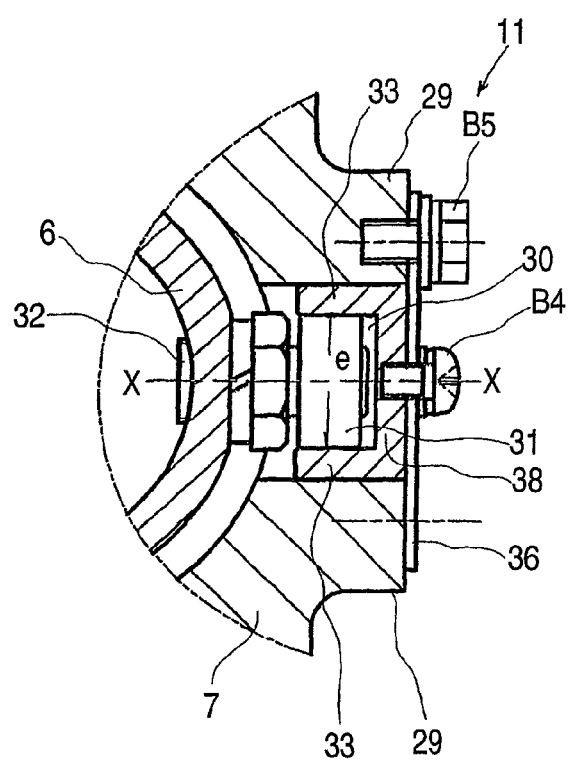
FIG. 5 is a sectional view showing one example of a rotation stopping mechanism of a guide rod.

In the rotation stopper device 11 of the guide rod 6, as shown in FIG. 2A and FIG. 5, the cam groove 30 is formed at the opening portion slotted in the side wall of the casing 7 within a predetermined range, in which the guide rod 6 moves in the direction of the center axis Y-Y. The roller follower 31, which is attached by locking the threaded portion of a roller pin 32 in the side face of the guide rod 6, is inserted in the opened cam groove 30.

In this case, the roller follower 31 makes linear contact with the guide surface of the cam groove 30 so that it is guided by the force of the rolling contact. Guide grooves are formed in the cam groove 30 at a rail distance e of the two parallel guide rails 33, and a lubricating medium such as grease is applied to the roller follower 31 and the guide rails 33. When the electrode tip E1 is moved back and forth, the rotational motion of the guide rod 6 is blocked by the rotation stopping device 11.

The rotation stopping device 11 can also be arranged between the arm bases 8A or the gun brackets 9, which are so attached to the two side faces of the casing 7 as to interpose the casing 7. Considering the workability such as the assembly or the maintenance, the rotation stopping device 11 is arranged at the position on the side opposite to those of the gun brackets 9.

The rotation stopping device 11 is arranged on the side face of the guide rod 6, and the center line X-X in the axial direction of the guide roller shaft of the roller follower 31 is normal (or perpendicular to the center axis Y-Y) to the arcuate face of the guide rod side face. The cam groove 30 for guiding the roller follower 31 can have a sizing precision for working the guide groove of the roller follower 31, and is cut into a generally recessed section directly from one key material by an end mill. The two guide rails 33 rise (stand) at a right angle from the two sides of a bottomed plate 38 of the cam groove 30 thereby to define the cam groove 30 by the rail distance e.

The clearance between the two guide rails 33 and the roller follower 31 has a sizing precision of 0.02 mm to 0.03 mm, and the roller follower 31 is smoothly guided along the two guide rails 33 by a rolling linear contact.

In this case, the bottomed plate 38 of a recessed section of the cam groove 30 is fixed by welding it to a plate cover 36 or mechanically by using a screw B4. The cam groove 30, as fixed in the plate cover 36, is inserted on the roller follower 31. The plate cover 36 is mounted on the opening peripheral edge portion 29 of the casing 7 by means of bolts B5. By closing the opening with the plate cover 36, the rotation stopping device 11 is sealed so that the foreign substance such as the sputter does steals into the casing from the ambient atmosphere.

Figures 9A, 9B, 9C:
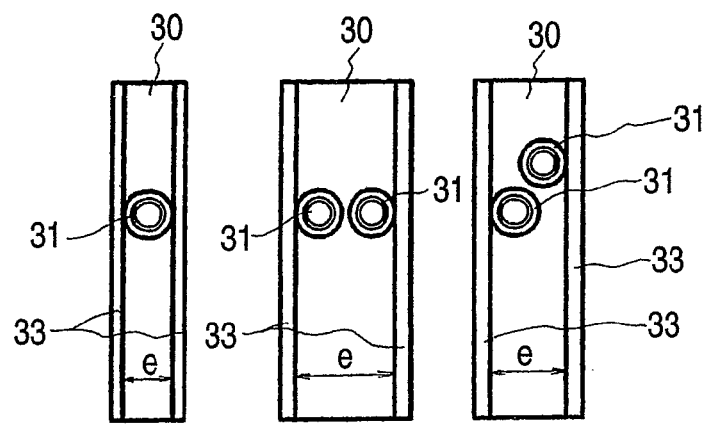
FIGS. 9A, 9B, 9C and 9D presents schematic top plan views showing other embodiments of the rotation stopping device according to the invention.

The rotation stopping device 11 of this embodiment corresponds to the case, in which the single roller follower 31 is guided by the guide rails 33 of two rows, as shown in FIG. 9A. In another embodiment, for example, similar effects can be attained by arranging the two roller follower 31 in two rows and by disposing the individually corresponding guide rails 33 of two rows on the side faces of the individual roller follower 31, as shown in FIG. 9B.

Figure 9D:
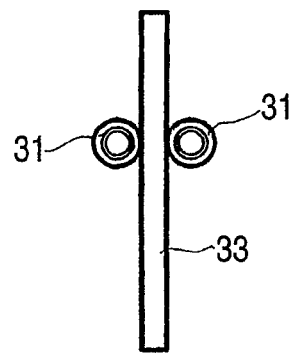
Figure 10:
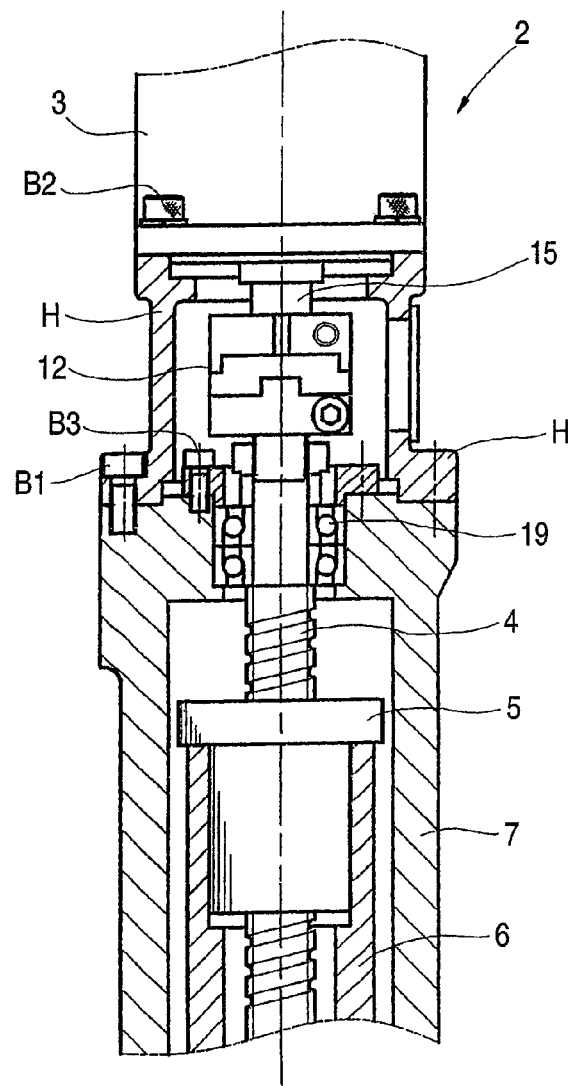
FIG. 10 is a sectional view showing an essential portion of one example of a fastening device of a drive unit of the related art.

As shown in FIG. 9C, moreover, the center axes of rotation of the roller follower 31 of two rows are shifted back and forth so that the rail distance e of the guide rails 33 can be made narrower than that of FIG. 9B. If the roller follower 31 of two rows are so guided by the two side faces of the rail as to sandwich the guide rail 33 of one row between the roller follower 31 of two rows, as shown in FIG. 9D, the rail distance e, as shown in FIGS. 9B and 9C, can be further narrowed.

Figure 4B:
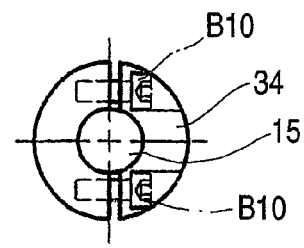
FIG. 4B is a top plan view of the fastening device.
Figure 4A:
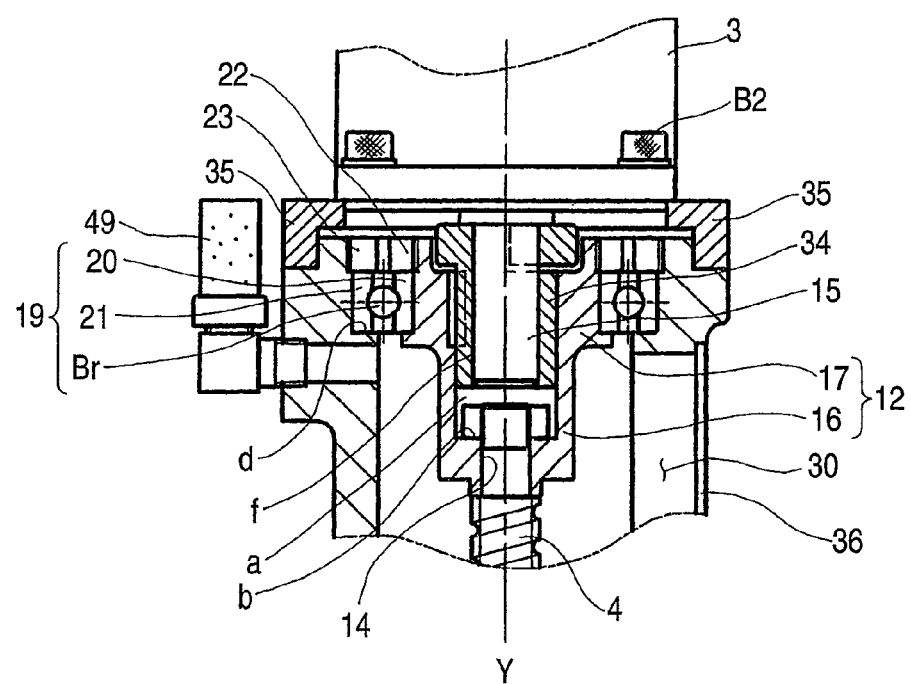
FIG. 4A is a sectional view showing an embodiment of another fastening device for fastening the output shaft of an electric motor and a ball screw in the drive unit of the invention.

In case the ball screw 4 and the output shaft 15 of the electric motor 3 are to be attached to the coupling 12, according to this embodiment, there are prepared an adapter 34 to be fitted in the outer circumference of the output shaft 15 and motor mounting brackets 35 adapted for the electric motors of two kinds, so that they may cover the case of a straight shaft, as shown in FIG. 4A, in which the outer circumference of the output shaft 15 of the electric motor 3 has the straight shape (as designated by f of FIG. 4A), or the case of a conical shape, as shown in FIG. 2A, in which the outer circumference of the output shaft 15 is converged toward the leading end to have the conical shape (as designated by c in FIG. 2A).

The motor mounting brackets 35 are fastened and fixed according to the kind of the motor on the head side opening of the casing 7.

The coupling 12 is assembled by inserting a key in the key groove in the outer circumference of the adapter 34, and is constituted as parts common to the two kinds.

In the case of the (tapered) output shaft 15 of FIG. 2A, the output shaft 15 is assembled on (fitted in) the inner circumference of the adapter 34 concentrically of the same, and the lock nut 13n is fastened on the threaded portion of the output shaft protruding from the connection hole of the adapter 34. As a result, the adapter 34 and the output shaft 15 are reliably fixed.

In the case of the (straight) output shaft 15 of FIG. 4A, the output shaft 15 is inserted concentrically of the coupling in the inner circumference of the adapter 34 having slots at the center. A fastening force is applied to the output shaft at the threaded portions in the confronting slotted faces of the adapter 34 through two bolts B10, so that the adapter 34 and the output shaft 15 are reliably fixed.

The cooling device 39 of the invention is shown in FIG. 1 and FIGS. 6 to 8. In the surface of the gun arm 8, the generally U-shaped piping groove 41 to act as the circulating system cooling medium passage of the electrode tip E2 is formed in the surface of the gun arm 8 along the longitudinal direction of the arm. In the inner face of the piping groove 41, a circulation line cooling tube 40 is fitted and fixed along the longitudinal direction. The circulation line cooling tube 40 has a sputter preventing coating cover 42, which is made of a refractory rubber material or a refractory synthetic resin material (e.g., a polyurethane group resin or a polyolefin group resin).

The piping groove 41 has a generally U-shaped section or a generally recessed section, which has such a depth that the external diameter of the cooling tube 40 is flush with or slightly sunk into the position of the surface of the gun arm 8. The piping groove 41 is machined by an end mill having an opening size smaller by about 0.2 to 0.4 mm than the external diameter of the tube 40. As a result, the cooling tube 40, as inserted along the piping groove 41, is reliably and closely fixed in the inner face of the piping groove by the elasticity and the expansion of the coating cover 42. As a result, the piping groove 41 need not necessarily have a working precision higher than the sizing precision of a water cooling pipe made of copper.

The cooling tube 40 has its rear end connected either to the circulation line cooling medium passage of the positive and negative power feeding conductor E5, as connected to the secondary side of the welding transformer 10, or to one of the suction and exhaust ports of a water-cooled manifold 44. In this case, the leading end of the cooling tube 40 is connected to a circulation line cooling medium passage (or a later-described tip base) 46 communicating with the inside of the electrode tip E2 fixed to the leading end of the gun arm 8. As a result, the electrode tip E2 is directly cooled.

The sputter preventing circulation line cooling tube 40 is prepared by disposing the coating cover 42 of the refractory rubber material or the refractory synthetic resin material on an inner tube 47 of a refractory synthetic resin material.

The gun arm 8 is so formed of a sheet material of a non-ferrous material of an aluminum group or an extruded material as to have a generally rectangular section. At the leading end portion of the gun arm 8 for holding the electrode tip E2, an electrode gripping portion 45 is formed to have a generally U-shaped section opened in the leading end face and from one side face to the other side face. The upper jaw 8a and the lower jaw 8b of the grip portion grip, when a fastening force is applied in a mechanically closing direction by bolts B9, the tip base 48 having the electrode tip E2.

In the U-shaped electrode grip portion 45, the confronting faces of the upper jaw 8a and the lower jaw 8b are formed in flat faces. In the portions of the upper jaw 8a and the lower jaw 8b of the leading end of the gun arm, bolt holes P1 are vertically formed to apply the fastening force in the direction to close the clearance of the two jaws.

The tip base 48 is so formed of an electrically conductive member of copper or its alloy into a generally rectangular section. The tip base 48 is so inserted into the electrode gripping portion 45 that the flat faces of the two jaws of the electrode gripping portion 45 and the two faces of the tip base 48 make face-to-face contacts. The tip base 48 is provided at the position corresponding to the bolt holes P1 with bolt holes P2 extending through the width across flat.

When pure mechanical means such as a mechanical fastening force is applied to the bolts B9 into the bolt holes in the direction to close the upper jaw 8a and the lower jaw 8b of the electrode gripping portion 45, the electrode gripping portion 45 is closed with the two faces of the tip base 48 being gripped by the flat faces of the electrode gripping portion 45. Then, these two members are closely fixed in an electrically reliable manner. In the electrode gripping portion 45, the cooling tube of the piping groove 41 is made to communicate with the cooling medium passage 46 formed in the tip base 48.

Figure 6:
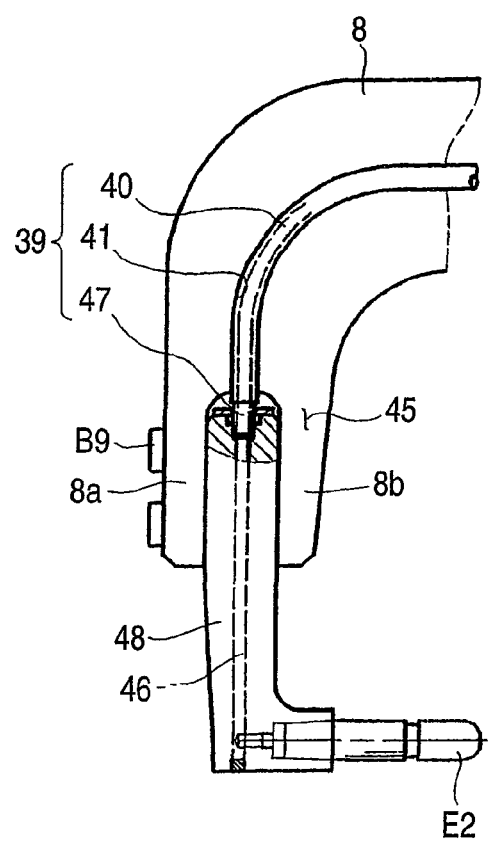
FIG. 6 is a sectional view showing an embodiment of a cooling tube jointing mechanism of a cooling device according to the invention.
Figure 7:
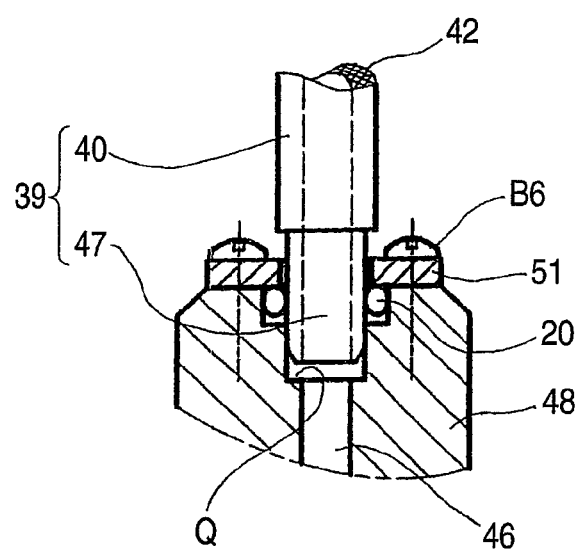
FIG. 7 is a sectional view showing another embodiment of the tube jointing mechanism.
Figure 8:
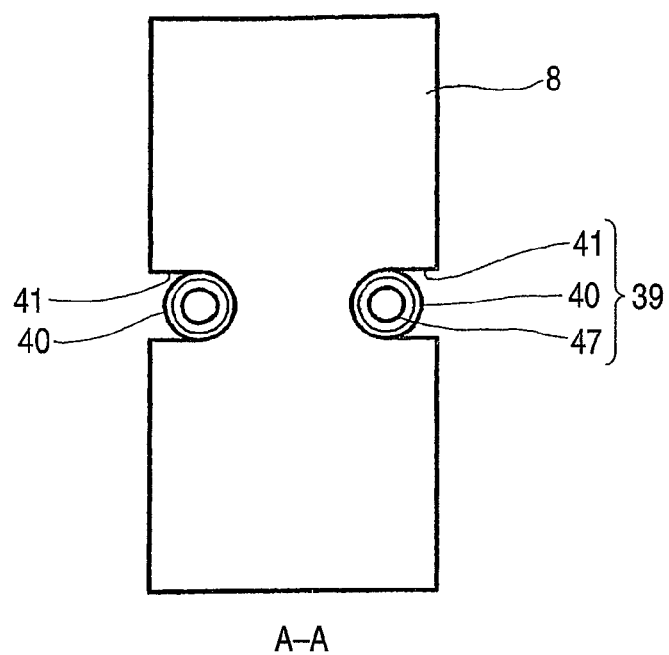
FIG. 8 is a sectional view taken in the direction of arrows A-A of FIG. 1 and showing an embodiment of a cooling device, in which a cooling tube of the invention is piped in a gun arm.

In the structure. as shown in FIG. 6 and FIG. 7, the leading end portion of the inner tube 47, as exposed by cutting off the coating cover 42 of the leading end of the cooling tube fitted and fixed in the piping groove 41 of the gun arm 8, is fitted in a recessed insertion port Q of the cooling medium passage of the tip base 48. The outer circumference of the leading end of the inner tube 47 is press-fixed gas-tight by fastening means such as an O-ring 50 (or packing) inserted into the insertion port Q on the cooling medium passage, and an O-ring holding plate 51 fixed by screws on the opening face of the insertion port Q.

The actions of the invention are described in the following. In the robot welding gun 1 of FIG. 1, the controller is taught in advance with information such as the position control pattern of the electrode tip E1 by the drive unit 2, the relative speed control pattern and the pressure control pattern at the approaching time with the electrode tip E2, the robot actions, the welding sequence based on the work information, and the welding parameters, so that the welding actions are reproduced by a digital control from the control unit of that controller.

When a weld starting signal is started, the electric motor 3 of the robot welding gun 1 is activated in response to a command from the control unit through a motor amplifier, the electrode tips are inserted into the point position with the relative motions between the electrode tips as well as the position control by the robot from the standby position to the point position, so that the electrode tip E1 is driven by the drive unit 2 toward the electrode tip E2.

When the electric motor 3 is activated, the drive unit 2 rotates the output shaft and accordingly the ball screw 4 connected directly to the coupling 12. By transmitting the rotating force to the ball nut 5 fixed on the guide rod 6, the guide rod 6 moves the oilless metal bearing 25 of the casing 7 linearly, so that the electrode tip E1 moves downward toward the electrode tip E2 fixed on the leading end of the gun arm 8, thereby to clamp and press the weld zone between the two electrodes.

The movement of the electrode tip E1 is detected by receiving the encoder pulses from the electric motor 3, and the welding point position of the work is pressed. When the input of a predetermined pressure is confirmed with a motor torque current, the power ON signal from a timer (or a weld control device) for controlling the welding power source in response to a command from the control unit of the controller is received to activate the switch of a contactor. Then, the welding current is fed from the welding transformer 10 to between the electrode tips E1 and E2 so that the weld zone is heated, melted and welded.

In the rotation stopping device 11 of the electrode tip E1 at this welding action time, the guide rod 6 moves in the casing 7, and the roller follower 31 is smoothly guided, while moving, by the force to cause the cam groove 30 to roll in contact along the surfaces of the guide rails 33. At the electrode pressing time, moreover, the position of the roller follower 31 is moved to the vicinity of the final end of the cam groove 30 thereby to block the rotation of the guide rod 6.

In the cooling device 39 at the welding time, at the electrode tip E2, the cooling water, when fed from the feed port of the cooled manifold 44 to the cooling tube 40 piped along the piping groove 41 of the gun arm 8, passes through the circulation line cooling medium passage 46 of the tip base 48 connected to the leading end of the cooling tube 40, and circulates in the electrode tip E2, so that it returns through the cooling medium passage on the return side from the cooling rube 40 piped in the side face of the gun arm 8 on the opposite side to the exhaust port of the cooled manifold 44. In this case, the gun arm 8 is air-cooled, and the electrode tip E2 including the tip base 48 is efficiently cooled by the cooling water fed/circulated concentratedly.

For cooing the electrode tip E1, the cooling water is fed from the tip holder 43 of the guide rod 6 through the cooling tube 40, and returns from the tip holder 43 after having circulated in the electrode tip E1. The cooling water passes along the side face of the shunt E3 and returns through the circulation line cooling medium passage of the secondary conductor E4 to the exhaust port of the cooled manifold 44.

After the end of the weld, in response to a command from the control unit of the controller, the electric motor is reversely rotated to return the electrode tip E1 to the original position. Specifically, the guide rod moves backward by the ball screw and the ball nut so that it is opened in the full stroke to the position, at which the front fastening portion of the coupling is inserted into the guide rod. Thus, one spot welding cycle is completed.

The resistance spot welder of the invention including the drive unit, the rotation stopping device and the cooling device has been described on the C-type robot welding gun in this embodiment. The gist of the invention is not limited thereto but can be converted to an X-type robot welding gun, a portable welding gun and another similar machine.

As compared with the drive unit of the related art, in which the output shaft of the electric motor and the ball screw are directly connected through the coupling, according to the invention, the ring-shaped ball bearing 19 concentrically placed over the coupling 12 is mounted on the outer circumference of the coupling 12, the front fastening portion 16 of the coupling 12 is inserted into the guide rod 6. As a result, the accommodating space of the fastening device in the longitudinal direction is omitted to shorten the longitudinal size of the coupling housing thereby to realize the reduction in the size and weight of the drive unit 2.

Next, in the invention, the cam groove 30 is formed in the side face of the casing 7 at the portion, which is opened long within a predetermined range for the movement in the direction of the center axis of the guide rod 6, the roller follower 31 attached to the side face of the guide rod 6 is guided along the cam groove 30. As a result, the external diameter of the casing 7 can be made smaller than the external rotation stopping rod of the related art. Moreover, the cam groove 30 and the roller follower 31 are confined in the casing 7 thereby to improve the appearance, to protect the rotation stopping device 11 against the interference with the outside and the intrusion of a foreign substance and to promote the reduction in the size and weight.

According to the rotation stopping device 11 of the invention, moreover, the recessed section groove having the guide rails 33 of two rows can be easily worked from one key material by an end mill. Merely by forming the cam groove 30 in the plate cover 36 to insert the roller follower 31 into the cam groove 30 through the opening portion, moreover, the rotation stopping device 11 can be easily set in the casing 7 so that it is completely sealed. As a result, the rotation stopping device 11 is effective for preventing the intrusion of the foreign substance into the sliding face for keeping the rotation stopping function, and can be maintained together with the cam groove 30 and the roller follower 31 merely by attaching and detaching the plate cover 36.

According to the invention, moreover, the sputter preventing circulation line cooling tube 40 having the coating cover 42 of a refractory rubber material or a refractory synthetic resin material is used to make it sufficient to push the cooling tube 40 merely along the generally U-shaped gun arm 8. For matching the sectional shape of the groove and for making the height of the cooling tube substantially flush with the surface of the gun arm 8, the piping operation is simplified by the shrinking properties and expanding properties of the coating cover 42 of the elastic member.

As compared with the piping actions of the water-cooled pipe of copper requiring the plastic deformation, moreover, the water-cooled pipe need not be tapped to avoid the deformation or breakage of the water-cooled pipe. Unlike the related art, moreover, the outer circumference of the water-cooled pipe of copper need not be brought into complete contact with the inner face of the U-shaped groove of the gun arm 8, so that the inner face working precision of the U-shaped groove need not be high.

Moreover, the sputter preventing circulation line cooling tube 40 having the coating cover 12 of the refractory rubber material or the refractory synthetic resin material is used to raise no corrosion problem due to the potential difference. Moreover, it is possible to dispense with the relay insulating device which has been needed in the related art for connecting the copper water-cooled pipe of the related art to the suction and exhaust ports of the manifold. As compared with the copper water-cooled pipe, therefore, it is possible to reduce the weight and size, to improve the durability and to lower the manufacture cost.

The tip base 48 is retained not by the extraction preventing mechanism of the cooling tube 40 but by the holding force resulting from the fitting fixture of the generally U-shaped piping groove of the gun arm 8. As a result, the connection between the tip base 48 and the cooling tube 40 needs no part such as the aforementioned connectors of the related art, but the connection between the gun arm 8 and the tip base can be made simple, compact and inexpensive.

What is claimed is:

1. A resistance spot welder comprising:
 a motor, having a shaft;

a cylindrical casing;

a hollow guide rod, inserted into the casing, and adapted to be moved in a linear direction along a center axis of the guide rod for moving a first electrode tip facing a second electrode tip provided at a gun arm;

a ball nut, fixed in an inner circumference of the guide rod;

a ball screw, fitted though the ball nut;

a coupling, including a first fastening portion into which the shaft of the motor is inserted and a second fastening portion into which the ball screw is inserted and which is integral with and opposite to the first fastening portion, the first fastening portion defining a hollow cylinder concentric with the center axis and connecting to the second fastening portion via a step, the second fastening portion also defining a hollow cylinder concentric with the center axis; and a bearing, fitted between an outer circumference of the first fastening portion and an inner circumference of the casing, wherein, the guide rod is moved in the linear direction, between a first point where the guide rod is retracted toward a motor side and a second point where the guide rod is extended toward an electrode tip side, the first fastening portion and the second fastening portion are arranged in the linear direction, the first fastening portion being on the motor side, the second fastening portion being on the electrode tip side, and when the guide rod is positioned at the first point where the guide rod is retracted toward the motorside, the second fastening portion is disposed in the inner circumference of the hollow guide rod, wherein the inner circumference of the guide rod is no more than the outer circumference of the first fastening portion in diameter, and the inner circumference of the guide rod is no less than an outer circumference of the second fastening portion.

2. The resistance spot welder according to claim 1, wherein an inner circumference of the second fastening portion is formed with a step portion on which an end of the ball screw is fixed, an inner circumference of the bearing is fixed to the outer circumference of the first fastening portion and an outer circumference of the bearing is fixed to the inner circumference of the casing, and the shaft of the motor is fixed in an inner circumference of the first fastening portion of the coupling.

3. The resistance spot welder according to claim 1, wherein a motor bracket is arranged between the motor and the casing, and the shaft of the motor is fixed in the first fastening portion of the coupling.

4. The resistance spot welder according to claim 1, wherein the inner circumference of the guide rod is no more than the outer circumference of the first fastening portion in diameter, and the inner circumference of the guide rod is no less than an outer circumference of the second fastening portion in diameter.

5. The resistance spot welder according to claim 1, wherein the shaft of the motor has one of a cylindrical shape and a tapered shape, and an adapter is fitted on the shaft of the motor.

6. The resistance spot welder according to claim 1, wherein a side wall of the casing is formed with an opening portion extending within a range between the first point and the second point, a cam groove member is provided on the opening portion and includes at least one guide rail, and the guide rod includes at least one roller follower guided along the at least one guide rail.

7. The resistance spot welder according to claim 1, wherein an oilless bush is disposed in the inner circumference of the casing at the electrode tip side, a scraper is disposed on the oilless bush at the electrode tip side, and a cap is mounted on the casing from the electrode tip side.

8. The resistance spot welder according to claim 1, wherein the gun arm is formed with a piping groove to be a cooling medium passage, a cooling tube having a coating cover made of a refractory rubber material or a refractory synthetic resin material is fitted and fixed in the piping groove, and the cooling tube has one end connected to one of a secondary conductor connected to a welding transformer and a water-cooled manifold and the other end connected to a cooling medium passage leading to an inside of the second electrode tip fixed at the gun arm.

9. The resistance spot welder according to claim 6, wherein the cam groove member includes a bottom plate and two guide rails which are parallel with each other and stand on both ends of the bottom plate, and the at least one roller follower is guided between the two guide rails.

10. The resistance spot welder of claim 8, wherein the cooling tube includes an inner tube made of the refractory synthetic resin material under the coating cover.

11. The resistance spot welder according to claim 9, wherein a plate cover for closing the at least one roller follower and the cam groove member is provided on the opening portion of the casing.

12. The resistance spot welder according to claim 11 wherein the bottom plate of the cam groove member is fixed on the plate cover.

13. The resistance spot welder according to claim 10, wherein the gun arm is made of a non-ferrous material of an aluminum group and includes a gripping portion having an opened U-shape at a leading end thereof, the gripping portion communicates with the piping groove, and a tip base having the second electrode tip is inserted into the opened U-shape of the gripping portion and held by a fastening member applying a force in a direction to close the opened U-shape.

14. The resistance spot welder according to claim 13, wherein the tip base has a cooling medium passage connected to the inner tube of the cooling tube.

* * * * *